Figure 1:
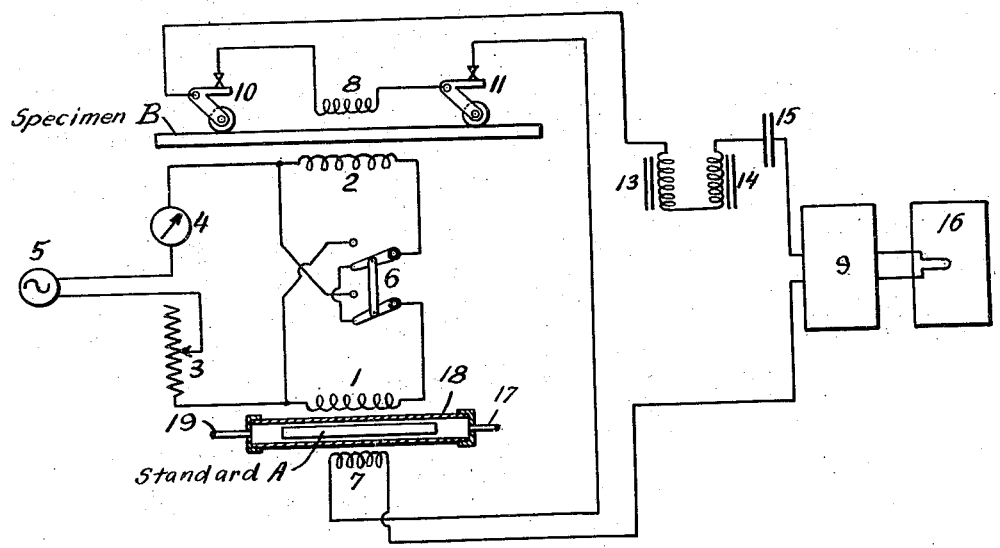

Jan. 21, 1936.  T. ZUSCHLAG  2,028,486

MAGNETIC ANALYSIS

Filed Nov. 2, 1933

Theodor Zuschlag
INVENTOR

Patented Jan. 21, 1936

2,028,486

UNITED STATES PATENT OFFICE 2,028,486

MAGNETIC ANALYSIS

Theodor Zuschlag, Englewood, N. J., assignor to Magnetic Analysis Corporation, Long Island City, N. Y., a corporation of New York Application November 2, 1933, Serial No. 696,370

1 Claim. (Cl. 175—183)

This invention relates to magnetic analysis and has for its object certain improvements in apparatus for the investigation of magnetizable objects to determine physical and/or metallurgical properties thereof. More specifically this invention contemplates improvements in apparatus for magnetic analysis, whereby stray electrical fields and other extraneous influences which affect results obtained in magnetic analyses may be compensated for or suppressed.

The apparatus and methods used in the art of magnetic analysis may be divided in general into two classes. In the first, or so-called "direct" method, a specimen to be tested is introduced into the field of a primary coil which is connected to an alternating current source. The flow of current in the primary coil produces an electromagnetic flux in the specimen and induces a current flow in a secondary circuit connected to a scondary coil which is placed in inductive relationship to the primary coil. The character and magnitude of the induced current in the secondary coil is influenced by the presence of the magnetizable object in the field of the primary coil, and this effect of the magnetizable body or specimen in the field may be interpreted to determine the physical and/or metallurgical properties of the body, when the secondary current is measured with a suitable indicating instrument.

The second or "comparative" method of magnetic analysis is one in which the properties of a standard of known magnetic characteristics and a specimen to be tested are compared. This is accomplished by placing the specimen and the standard respectively into the fields of two primary coils which are energized by a common source of alternating current. One of a pair of secondary coils is placed in inductive relationship with each primary coil, and the pair of secondary coils is connected in series opposition with suitable current indicating means, such as an oscillograph or a galvanometer. By connecting the two secondary coils in series opposition the effect in general is to produce a current which is the resultant of a difference in magnetic properties between the specimen and the standard, and by placing an indicating means in the secondary circuit this current may be determined and utilized to predict differences in the properties of the specimen and the standard.

The character of the induced current in the secondary circuit when either the "direct" or "comparative" method and apparatus is used, is complex as manifested by the complicated wave form that may be produced on a current recording means associated with the circuit. If the effect of extraneous influences, such as stray fields, is compensated for or eliminated, the character of the magnetizable objects under investigation may be determined from a study of the resultant induced current in the secondary circuit.

Due to the complex wave form of a secondary current induced by these means, it is more satisfactory to isolate one harmonic of the current at a time for the purposes of analysis. When one harmonic at a time is thus separated, the peculiarities of the induced secondary current may be analyzed with greater facility than when the complete wave form is considered.

In the heretofore customary art of magnetic analysis, selection of individual harmonics of the secondary currents has been accomplished through the use of filter means, such as a suitable inductance coil connected in series with a suitable condenser in the secondary circuit. Such filter arrangements have not been entirely satisfactory because of the influence of stray magnetic fields which induce disturbing electromotive forces in the inductance means of the filter, and thereby produce distorted results. Apparatus used for magnetic analysis is generally productive of stray magnetic fields of considerable strength, and hence the errors due to such fields may be sufficient to vitiate the results of magnetic analysis entirely, or at least interfere markedly in a search for small defects in the specimen.

When the comparative method of magnetic analysis is employed to determine differences between standard and specimen, it is customary to leave the standard in place in one set of coils while several specimens are compared one after the other. As a result, the standard may become sufficiently heated by the variation in flux to suffer a change in magnetic characteristics, and thus introduce error into comparative results. To overcome this adverse effect, it has been proposed to employ cooling means to hold the temperature of the standard substantially constant and normal.

As a result of my investigations in the art of magnetic analysis, I have developed apparatus in which errors in analysis due to the effect of stray fields upon the inductance coil of a filter arrangement may be eliminated, and in which the accuracy in continuous comparative testing is not impaired by changes in the magnetic characteristics of the standard. The apparatus of the invention involves the use of a testing circuit containing an astatic filter combination that is not affected by stray electromagnetic fields.

The invention will be better understood by referring to the accompanying drawing, in which—

Fig. 1 is a diagrammatic representation of a preferred form of the apparatus.

Referring to Fig. 1, a suitable source of alternating current 5 is connected in series with an ammeter 4 and a variable resistance 3. A double pole, double throw switch 6 is provided so that primary coils 1 and 2 may be connected either in series or in parallel. Primary coils 1 and 2 preferably consist of a suitable number of turns of insulated metal wire of low ohmic resistance.

Secondary coils 7 and 8 are disposed in inductive relationship with primary coils 1 and 2, preferably by locating them within the primary coils 1 and 2 in axial alignment therewith. The coils 7 and 8 are connected in series opposition with a filter arrangement comprising inductance coils 13 and 14 and condenser 15, and with amplifying means 9. A suitable indicating device 16, such as an oscillograph, a galvanometer, etc., is connected to amplifier 9. Switches 10 and 11 are placed in the secondary circuit at either side of the secondary coil 8. By connecting the secondary coils 7 and 8 in series opposition, the electromotive forces induced in them are opposed and the resultant current induced in the circuit will be the difference between the induced forces in the secondary coils. The secondary coils 7 and 8 are substantially identical in construction, and are preferably composed of a suitable number of turns of insulated metallic wire of low ohmic resistance. Switches 10 and 11 are adapted to be closed automatically when an object is inserted into the field of coils 2 and 8, and to open and remain open when the object is withdrawn. In this manner the secondary circuit 7, 8, 13, 14, 15, 9 is protected against overloading.

The filter arrangement of the secondary circuit comprises inductance coils 13 and 14 connected in series with condenser 15. The coils 13 and 14 are identical in construction, being composed of a suitable number of coils of insulated metallic conductor wound around an open iron core. The two inductance coils 13 and 14 are located side by side and connected in such a way that the magnetic fluxes induced in each are in series combination. Such an arrangement presents an astatic condition, since the coils are connected in series opposition to extraneous stray magnetic fields. Stray fields are thus opposed and prevented from influencing the character and/or magnitude of the currents induced in the secondary circuit.

The inductance of coils 13 and 14 and the capacitance of condenser 15 may be so chosen with respect to each other and to the frequency of the primary current in coils 1 and 2 as to offer high impedance to the induced current except at the harmonic which has been selected for purposes of investigation. The selection of the proper inductances and capacity for a particular condition of resonance may best be illustrated by the following examples, using the formula for resonant conditions:

$$f = \frac{1}{2\pi\sqrt{L.C.}}$$

where $f$ = the frequency desired in cycles per second, $L$ = the sum of inductances of the coils 13 and 14 in henrys, $C$ = the capacitance of the condenser 15 expressed in farads.

If a resonant condition for a 60-cycle current is desired, the fundamental or first harmonic is 60 and is substituted for $f$ in the equation, which is then solved for the product L. C. For any given harmonic the product L. C. is constant. Assume that the coils 13 and 14 have an inductance of 8 henrys. Dividing the known product L. C. by .8 determines that the capacitance of the conductor for resonance at 60 cycles should be 9.2 microfarads.

If resonance at the third harmonic is desired, $f$ is made equal to 180; the equation is solved for the product L. C., and the value of either L or C is chosen arbitrarily in order to solve for the other. Thus, if for the third harmonic an inductance of .25 henrys is chosen for coils 13 and 14, a capacitance of 3.1 microfarads for condenser 15 will be required.

It will be observed that there are an infinite number of combinations of capacitances and inductances which will produce resonance for any desired harmonic, since all that is essential is that the mathematical product of values of inductance and capacitance remain constant. However, as the inductance is increased and capacitance is decreased, the tuning of the circuit becomes sharper.

The method of magnetic analysis, employing the apparatus illustrated in Fig. 1, is as follows: Inductance coils 13 and 14 and condenser 15 are chosen for the particular harmonic to be investigated, usually the fundamental one, and placed in the secondary circuit. A standard A of known magnetic and metallurgical characteristics is inserted in the field of coils 1 and 7, and a specimen B to be investigated is placed in the fields of coils 2 and 8. Placing specimen B in the field automatically closes switches 10 and 11 and completes the circuit 8, 11, 13, 14, 15, 9, 7, 10. The induced resultant secondary current, if any, is observed at indicator 16, which may be an oscillograph. The operation is then repeated, substituting suitable inductance coils 13 and 14 and a suitable condenser 15 to select the third or any other harmonic desired. The operation may be repeated as many times as desired to determine the presence or absence of any number of the harmonics of the desired currents. Under most conditions, the property or defect which is sought will be indicated in either the first or third harmonic, and it will not be necessary to consider other harmonics. When no indication is apparent in the first or third harmonics, it is ordinarily safe to predict that the specimen is substantially like the standard A in metallurgical and/or physical properties.

Continuous operation, leaving the standard in place in the coils between determinations, is desirable in commercial work for reasons of speed. Under such circumstances, it is essential that the standard be kept at constant temperature in order that no errors due to a change in magnetic characteristics by heating are introduced. For this reason cooling tube 18 and pipe connections 17 and 19 are provided to permit the flow of a cooling medium, such as water, therethrough.

When large sized specimens are under investigation it is sometimes advisable to induce stronger magnetic fields than can be obtained with the primary coils in series. For this reason switch 6 has been provided, by which the primary coils may be connected either in series or in parallel.

It should be pointed out that better results in magnetic analysis are usually obtained when the secondary coils fit the specimen rather closely. Consequently it is preferable, when dealing with samples of various sizes, to provide several sets of secondary coils of various diameters, which are interchangeable within the fixed primary coils. A convenient form of construction is to wind the secondary coils over tubes of bakelite or other insulating materials which are of various diameters. By providing bushings of insulating material or other appropriate means the secondary coils may be firmly centered within the primary coils, at the same time being adaptable for easy interchange.

Ordinarily, proper conditions for magnetic analysis require that the axes of the primary and secondary coils coincide, but conditions are sometimes encountered when the resultant balance of the secondary circuit may be obtained by shifting the secondary coils off center of the primary coils. In the event that this condition should arise, the several sets of secondary coils are preferably adapted for moving off center, as by adjusting the position of the bushings with respect to the secondary coil.

The apparatus of this invention has been found to be of particular utility when it has been discovered that a certain harmonic of the induced current is associated with a particular defect or property whose presence or absence is to be determined. When this condition obtains, a great many specimens or sections of a single long speciman may be tested with ease and rapidity by tuning the secondary circuit to the appropriate harmonic by inserting a filter containing the proper capacitance and astatic inductances. When this is done, any movement of the indicating means may be taken as an indication that the sought for defect or property exists, and a zero reading on the indicator establishes that standard and specimen are similar in so far as the particular property is concerned.

When the indicating device is an oscillograph, the sine curves of current due to the selection and reproduction of one harmonic at a time make the interpretation of the results quite simple. This is of value in commercial application, in that no particular skill is required in order to obtain satisfactory results.

It will be understood that the use of an astatic filter is not limited to apparatus in which comparative tests of a known standard and a specimen are made. The astatic filter is equally applicable to the so-called "direct method" where no standard is simultaneously subjected to the influence of an electro-magnetic field. In either the "direct" or "comparative" methods, the simplification of the wave form due to the selection of a single harmonic, and the elimination of stray fields by means of induction coils in astatic combination are productive of improved results. Modifications of the apparatus may be made by those skilled in the art, without however, departing from the spirit of the invention.

I claim:

A magnetic analysis apparatus comprising a primary circuit connectible with a source of alternating current and containing two primary coils disposable in inductive relationship respectively with a magnetizable standard and a specimen, switching means whereby said primary coils may be connected in series or in parallel, cooling means adapted to maintain the magnetizable standard at a constant temperature, a secondary circuit containing two secondary coils connected in series opposition and disposed respectively in inductive relationship with said primary coils, a current indicating device associated with said secondary circuit, an astatic filter adapted to pass current of one frequency only connected in said secondary circuit, and automatic switching means adapted to close the secondary circuit when a specimen is placed within the field of a primary coil.

THEODOR ZUSCHLAG.